W. C. SHIPHERD & E. P. CURTISS.
Thill-Couplings.

No. 138,702.        Patented May 6, 1873.

UNITED STATES PATENT OFFICE.

WILLIAM C. SHIPHERD AND EDWARD P. CURTISS, OF CLEVELAND, OHIO, ASSIGNORS OF THREE-FIFTHS THEIR RIGHT TO S. S. COE, JOHN J. SHIPHERD, AND JAMES R. SHIPHERD, OF SAME PLACE.

IMPROVEMENT IN THILL-COUPLINGS.

Specification forming part of Letters Patent No. 138,702, dated May 6, 1873; application filed January 28, 1873.

*To all whom it may concern:*

Be it known that we, WILLIAM C. SHIPHERD and EDWARD P. CURTISS, of Cleveland, in the county of Cuyahoga and State of Ohio, have invented certain new and useful Improvements in Thill-Couplings for Vehicles, of which the following is a specification:

This invention relates to a novel and effective method of connecting carriage thills and poles to the axle; and it consists in the provision of a sectional bearing-bolt provided with conical ends fitted in correspondingly-shaped seats in the ears or eyes of the clip or shackle, and with square or angular shanks inserted and retained in the eye of the thill-iron by a transverse screw-bolt, as will be hereinafter more fully described.

Figure 1:
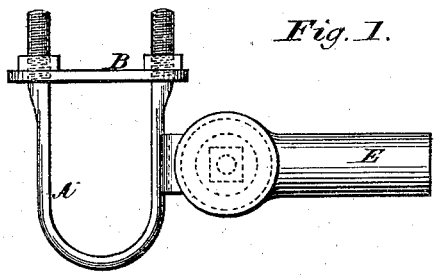
Figure 2:
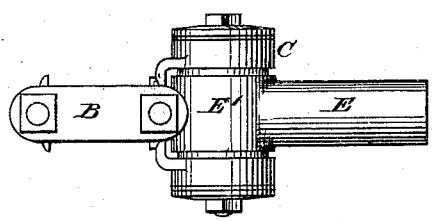
Figure 3:
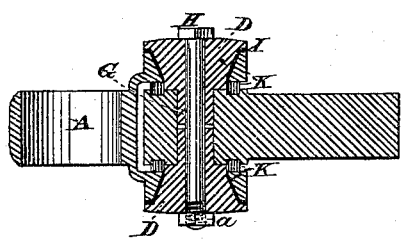
Figure 4:

In the drawing, Fig. 1 represents a side elevation of our invention. Fig. 2 represents a plan or top view of the same. Fig. 3 illustrates a central longitudinal section, and Fig. 4 a detail view of the sectional bolt and receiving-seat in the clip.

The clip or shackle A is provided with the usual yoke B, or other preferred means for connecting the same to the axle of a vehicle and with the lateral ears or jaws C. Said ears are provided with conical or tapering recesses or sockets K forming seats for the reception of the bisected or sectional bearing-bolt or tap D. The thill-iron E is provided with the usual appendages for securing it to the thills or pole and possesses a tubular eye, E', at its rear extremity, which is inserted between the jaws or ears and retained firmly in position while permitting its free vertical movement by the bearing-bolt D. Said bolt is provided with square shanks or tenons G, which enter the eye of the thill-iron, and are made with an axial bore or opening for the passage of a retaining-bolt, H, which firmly secures the parts in proper relation to each other. The shanks or tenons being made square or angular and inserted into correspondingly-shaped openings in the thill-iron, the latter will be prevented from turning on or independently of the sectional bolt D. The conical ends or heads of the latter and corresponding seats in the jaws of the clip afford a firm and enlarged bearing-surface, and an effectual medium for counteracting the effects of wear by adjusting the sectional bolt in its seats, which is accomplished by the screw-bolt H and nut *a*. For preventing noise or rattling and a too rapid wear of the parts by frictional contact, I apply to the conical ends of the bisected bolt leather or elastic washers, I, into annular grooves or seats formed on the ends of the tubular eye F of the thill-iron. Said washers are retained in position by suitable lips or projections so as to be readily removed when worn for the insertion of new ones.

We do not broadly claim two conical bearing-surfaces, which are calculated to be pressed upon the thill-iron by a bolt, for such is not new; but

Having thus described our invention, what we claim as new, and desire to secure by Letters Patent, is—

The hollow angular tenons G G formed with the conical bearing-bolts D D and angular eyes S S, in combination with the thill-iron E, the adjusting and retaining bolt H, and the shackle A having the conical recessed jaws C C, and the interposed packing, substantially as herein shown and described, for the purpose specified.

In testimony that we claim the foregoing we have hereunto set our hands this 9th day of January, 1873.

WM. C. SHIPHERD.
EDWARD P. CURTISS.

Witnesses:
 GEO. MENGER,
 M. GALLAGHER.